1,705,065

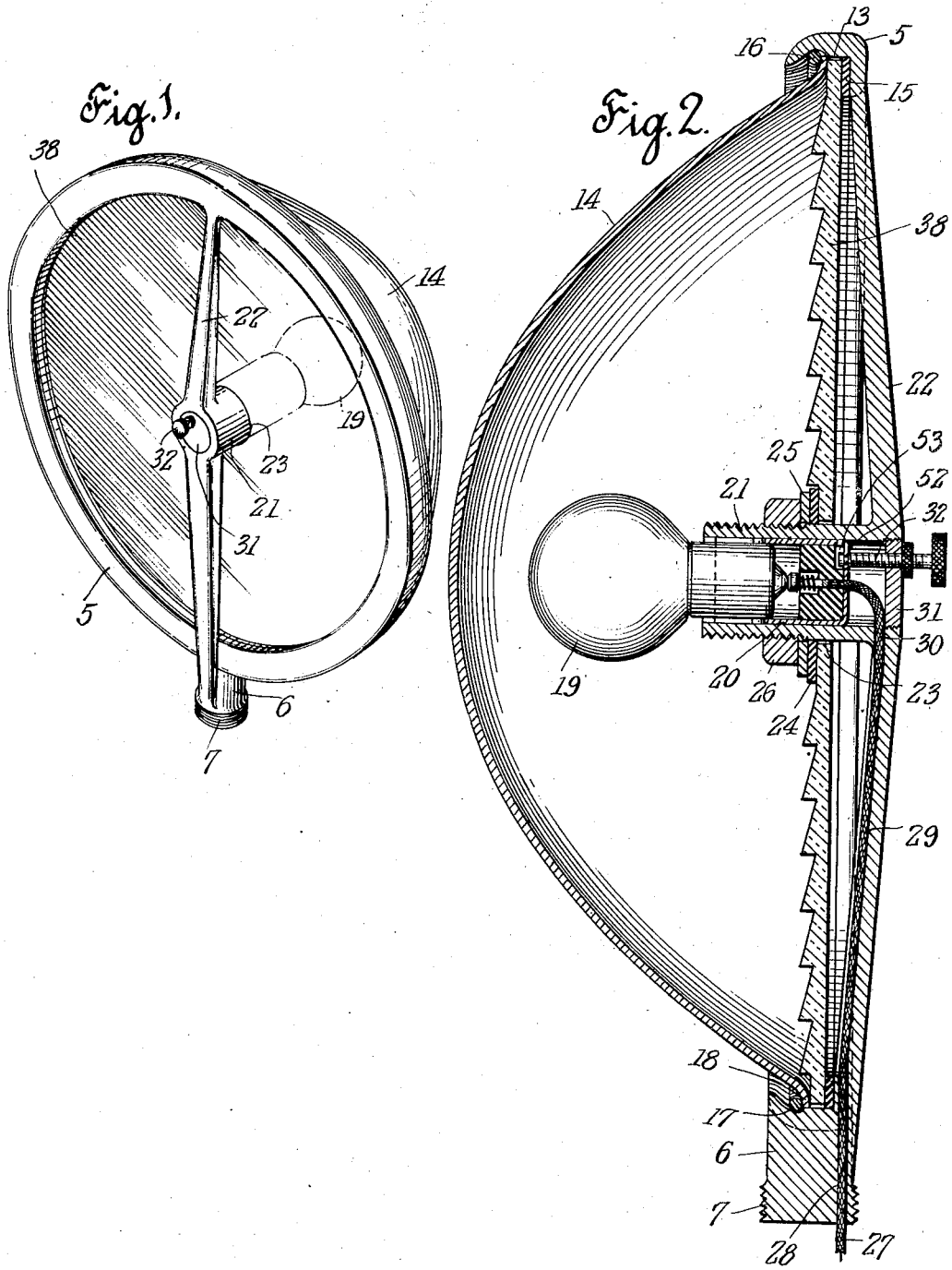

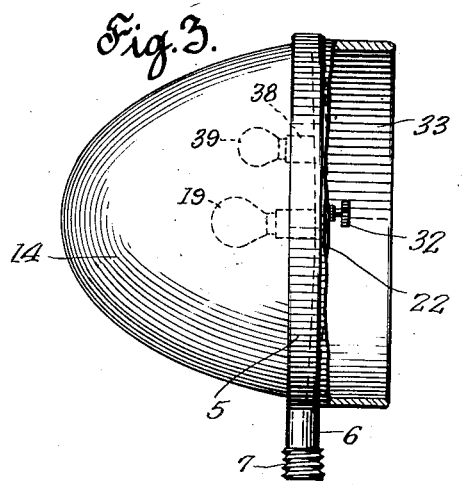
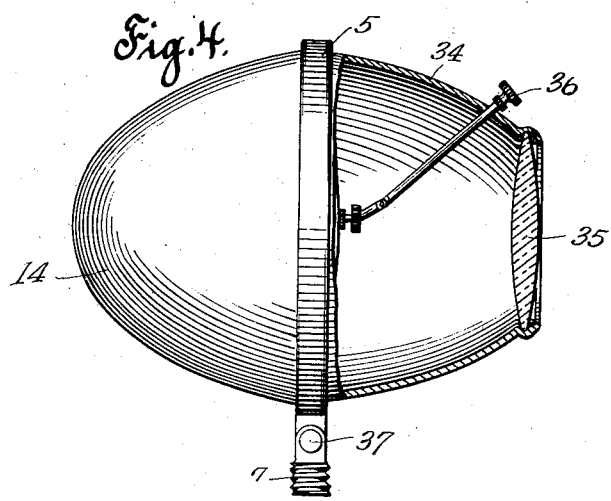
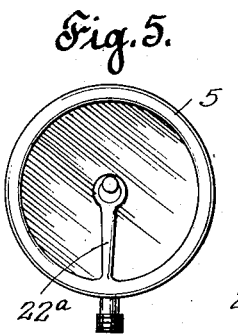
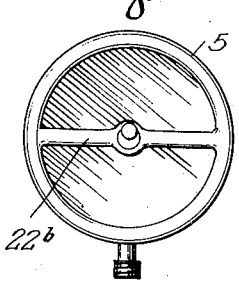
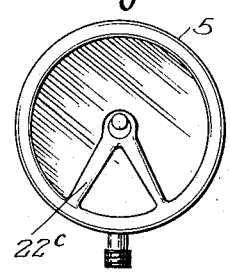
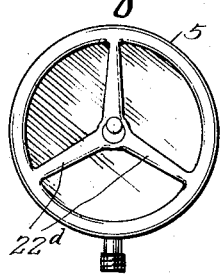
INVENTOR
Edmund B. Neil
BY
Philip S. McLean
ATTORNEY March 12, 1929.　　　E. B. NEIL　　　1,705,065
LAMP
Filed Dec. 31, 1926　　　3 Sheets-Sheet 3
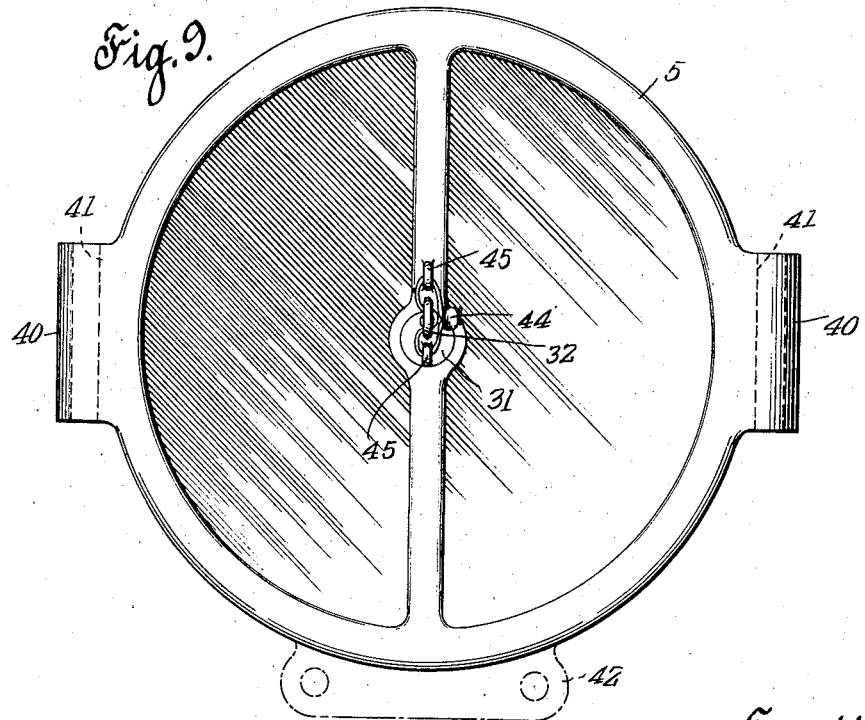
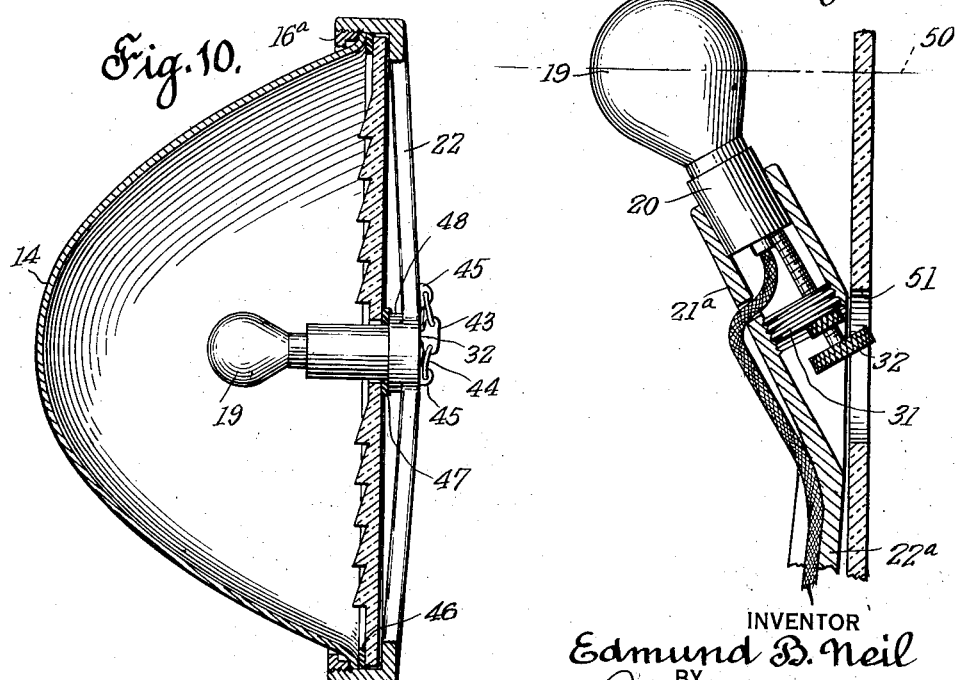
INVENTOR
Edmund B. Neil
BY
Philip S. McLean
ATTORNEY Patented Mar. 12, 1929.

UNITED STATES PATENT OFFICE.

EDMUND B. NEIL, OF PHILADELPHIA, PENNSYLVANIA.

LAMP.

Application filed December 31, 1926. Serial No. 158,255.

The present invention relates particularly, though not exclusively, to lamps for motor vehicles.

The objects of the invention are to simplify and improve lighting apparatus; to combine the supporting structure and the lamp structure in a single unit serving as a base and a support for all other parts, including the reflector, the lens and the lamp proper; to provide the reflector in a complete, uninterrupted form; to provide for direct focusing of the lamp at the front of the lamp structure, and to reduce the number of parts and facilitate the easy assemblage of the same.

These and other desirable objects are attained by certain novel features of construction, combination and arrangement of parts as will hereinafter appear.

The drawings accompanying and forming a part of this specification illustrate several practical embodiments of the invention and it should be understood that the structure may be modified as regards this disclosure without departure from the spirit and scope of the invention as hereinafter defined and broadly claimed.

Figure 1 is a perspective view of the complete lamp as mounted and in use.

Figure 2 is an enlarged vertical sectional view of the same.

Figures 3 and 4 are side views partly in section illustrating further developments of the invention.

Figures 5, 6, 7 and 8 are front views illustrating different forms and arrangements of the radial arms for supporting the lamp socket.

Figures 9, 10 and 11 are front, vertical sectional and sectional detail views, respectively of other modifications.

The base or body of the lamp comprises a ring 5 which has attached to and forming an integral part of it, a lug or post 6 by which the lamp is mounted and supported in place. In this particular disclosure this supporting lug is screw threaded at 7 for mounting purposes.

The back of the lamp ring is inset to provide a seat 13 for the lens or lamp cover 38 and the reflector 14. To make these parts weather-tight, a packing ring 15 is shown about the front edge of the glass and the rim of the reflector is held tight against the back edge of the glass by a clamping ring 16 sprung into a groove 17 inside the ring, said ring bearing against an outturned flange 18 at the edge of the reflector. If desired, a packing ring may be interposed between the back of the glass and the flange of the reflector, but with the parts properly fitted, the spring ring will hold the reflector so firmly against the glass as to require no packing at this point.

The reflector is shown as of the parabolic type but the same may be of any desired shape or design. A special feature of this reflector is that it is continuous and uninterrupted as indicated in Figure 2 so as to provide the maximum reflecting surface.

The lamp or light source is indicated at 19 and it is shown as supported wholly in front of the reflector in a socket 20 mounted in the bore of a tubular hub 21 carried by a bar 22 extending diametrically across the lamp ring. This bar serves as a diametrical brace and support for the ring and while there is some advantage in arranging it vertically as indicated, with its root in line with and in effect forming an inner extension of the bracket post 6, it should be understood that the same may be arranged horizontally or inclined, and further, that it may be branched in Y-form or be made only as a radial arm extending in from one side to the approximate center of the ring.

The lamp cover or lens 38 is perforated at 23 to pass over the socket hub and to make a close joint at this point; a rubber gasket 24 is shown forced over the hub and held by metal washer 25 which is engaged by a nut 26 screwed over the hub from the rear. This acts also as a clamp securing the glass independently of the reflector and thereby relieving the reflector of possible strain. This feature becomes important when the reflector is made as a relatively thin shell.

The wiring for the lamp is indicated at 27 as extended up through a bore 28 in the bracket lug 6 into an open groove 29 in the back of the bar 22 and through a bore 30 into the forward portion of the hub.

The forward end of the hub is shown as closed by a screw plug 31 and this plug is shown as utilized as a mounting for the focusing screw 32 which has a connection with the lamp socket for shifting the same back and forth in the hub.

This invention, it will be seen, materially simplifies the construction and mounting, improves the illuminating effects and facilitates the proper focusing of the lamps. While an outside cover may be employed, this is not usually necessary as the reflector shell is imperforate, serves as a complete enclosure and can be made heavy enough to act in this extra capacity. As a matter of fact, the ring affords sufficient strength for the entire lamp, being in the nature of a rigid frame which protects all the lamp parts. The parts are quickly and easily assembled from the back, the glass being first dropped into the frame and secured at the hub, the lamp being then placed in its socket and the reflector being last entered in the frame and secured by the snap ring. With the parts so assembled the lamp can be quickly focused by simply turning the adjusting screw at the front. The two part supporting bracket permits of the lamp being easily adjusted or removed at any time and this separable post construction provides a short stout support, forming a solid rigid base eliminating vibration. The simplicity of the structure also gives the lamp a pleasing appearance and reduces the cost of production.

The ring with its integral support may be made in cast metal or pressed in sheet metal or otherwise produced so as to form a rigid frame and supporting structure.

If desired, the structure may be extended in front of the ring as shown in Figure 3, where an annular shell extension 33 is added. This improves the appearance, cuts off undesirable light rays, serves as a guard for the glass front and may be used to support a color screen, lens or the like. In Figure 4 a shell 34 is thus shown extended in front of the frame and contracted to hold a lens 35.

In this case an extension for the focusing screw is provided, the same being indicated as an universally jointed shaft 36 extended out through the top of the front shell extension. In this latter view the supporting lug is indicated as having a pivot joint 37 for enabling the lamp to be tilted. The focusing shaft extension may be located in line with the arm which supports the lamp socket so as not to intercept useful light rays.

Figures 5, 6, 7 and 8 illustrate different arrangements of the arms for supporting the lamp socket, the first showing a single arm 22ª extending only to the center of the lamp structure, Figure 6 showing a horizontally extending diametrical support 22ᵇ, Figure 7 showing convergent inclined arms 22ᶜ and Figure 8 showing a triangular arrangement of radial supporting arms 22ᵈ.

The socket supporting arm or arms may carry an additional socket 38 located "off-center" for carrying a "dimmer" light 39 as shown in Figure 3.

In order that the lamp may be used with the forked lamp supporting brackets now provided on many automobiles, the ring or frame of the lamp structure may be formed with integral lugs or post 40 at the sides of the same pierced at 41 to receive the points of the bracket. For other forms of mounting, the integral lug or post may be modified accordingly. In Figure 9, a lug is indicated in broken lines at the bottom of the frame at 42 for attachment to a bracket or other member on the car.

In Figures 9 and 10, the focusing screw 32 is shown as having a key head 43 perforated to receive a sealing wire 44 which is passed through one or more lugs 45 on the socket carrying arm or plug 31. This permits of the lamp being sealed in properly fixed relation after having been set by the proper authority.

If desired, the lens and reflector may both be held in place by a single fastening. This feature is illustrated in Figure 10 where a screw ring 16ª is shown engaging in the back of the frame ring, bearing against the flange of the reflector, which latter through the intermediacy of a gasket 46 bears against the rim of the lens or lamp cover. The lamp cover in this case is perforated as before to pass over the hub of the lamp socket and a gasket 47 is shown interposed between the front of the lens and a shoulder 48 at the base of the hub so as to provide a closed joint about the opening in the lens. The single fastening 16ª thus holds all these parts in properly assembled relation. The advantage of using a screw ring at this point is that the same may be readily adjusted to take up for wear or for looseness of the parts.

Figure 11 illustrates how the lamp may be set on an incline instead of being faced directly toward the reflector by arranging the socket hub 21ª on an incline so that the lamp socket 20 and hence the lamp will stand in inclined relation to the axis of the reflector.

The reflector, being imperforate, can be produced at less cost and actually is more efficient than the ordinary type of reflector which has a hole for the lamp socket punched in the center of the same. The punching of this hole frequently results in the distortion of the reflector, throwing it out of shape and hence out of "true". Also, with this new structure and arrangement, the entire central portion of the reflector is used and the light issuing from the top of the lamp, instead of from the back of the same, is utilized for illuminating purposes. Thus the most effective portions of both the reflector and the lamp are made use of.

The mounting means for the lamp being connected with the rigid ring or frame and having no connection with the shell or reflector, provides a substantial support having no connection with the reflector. The reflector thus is not subjected to any strains and can be taken off and put on without disturbing the mounting of the lamp.

The shape and arrangement of the parts may be varied; for instance, the ring or frame instead of being circular may be made elliptical or in square or other angular outline.

A special advantage of the form of the invention shown in Figure 11 is that the support for the lamp and the body of the lamp itself are entirely below the focal center represented by the line 50. Thus the direct rays and the reflected rays as well are not obstructed by the lamp or lamp support. If found desirable, the lens or cover for the reflector may be placed in front of the lamp support instead of behind it, as indicated in this view, it being then only necessary to leave a small hole 51 in the cover for access to the focusing screw. For purposes of adjustment, the screw is shown as having an annular groove 52 in the end portion thereof engaging in a slotted part 53 in the end of the lamp socket so that the screw will be effective either to advance or to retract the socket and also to prevent the socket from turning in the holder which supports it.

What is claimed is:

1. A lamp comprising a rigid frame having a rearwardly faced seat and provided with an integral post by which the lamp structure is supported, said frame provided with an integral radial arm, a rearwardly faced lamp socket carried by said arm, a lamp cover applied to said frame from the rear thereof and engaged in the rearward seat aforesaid, said lamp cover being provided with a passage in line with the lamp socket, a lamp mounted in said socket at the rear of said cover and a reflector having a continuous reflector surface, said reflector being applied to the back of the frame and engaged in the rearwardly faced seat in the back of the frame over said independently supported lamp.

2. A lamp comprising a rigid ring having an integral supporting post and provided with a radial arm having a substantially centrally located hub, an illuminant carried by said hub, a reflector applied to the back of said ring over said illuminant, a cover seated in the ring in front of the reflector, said cover having a passage for the hub and a clamp for the cover engaged with said hub and providing a sealed joint between the hub and cover.

3. A lamp comprising a rigid ring having an integral supporting post and provided with a radial arm having a substantially centrally located hub, an illuminant carried by said hub, a reflector applied to the back of said ring over said illuminant, said reflector having a close joint with the ring and forming the external casing of the lamp structure.

4. A lamp comprising a rigid ring having an integral supporting post and provided with a radial arm having a substantially centrally located hub, an illuminant carried by said hub, a reflector applied to the back of said ring over said illuminant, a cover seated in the ring in front of the reflector, said cover having a passage for the hub and means for providing sealed joints between the rim of the cover and the ring and between the central portion of the cover and the hub.

5. A lamp comprising a supporting frame having an integral mounting post and provided with a seat at the back of the same surrounded by a retaining flange, a packing member on said seat, a lamp front seated within the flange and engaged with said packing member, a reflector shell seated within the flange behind said lamp cover, a rigid bracket arm projecting from the rim of the frame inwardly toward the focal axis of the reflector and disposed in front of the cover, said cover having a passage therethrough and an illuminant supported by said bracket arm in line with said passage, said illuminant consisting of an electric lamp and the mounting for said lamp including a lamp socket, the bracket arm having a hub receiving said lamp socket and extending rearwardly through the passage in the cover.

6. A lamp comprising a supporting frame having an integral mounting post and provided with a seat at the back of the same surrounded by a retaining flange, a packing member on said seat, a lamp front seated within the flange and engaged with said packing member, a reflector shell seated within the flange behind said lamp cover, a rigid bracket arm projecting from the rim of the frame inwardly toward the focal axis of the reflector and disposed in front of the cover, said cover having a passage therethrough and an illuminant supported by said bracket arm in line with said passage, the bracket arm having a hub projecting rearwardly through the passage in the cover and provided with a bore, a lamp socket mounted in said bore and the illuminant being in the form of an electric lamp seated in said socket.

7. A lamp comprising a supporting frame provided with integral means by which the same is mounted, a reflector secured to the back of said frame at its periphery, said reflector having a continuous unbroken surface in the central portion of the same, a lamp cover held in the frame in front of the open side of the reflector and illuminating means supported from the frame in position within the reflector and directly exposed to the unbroken central portion of the reflector, said illuminating means being carried by an arm extended inwardly from the frame and provided with a hub, the lamp cover being perforated to receive said hub and packing between said perforated cover and hub.

8. A lamp comprising an integral rigid ring provided with an integral mounting post by which the lamp structure may be supported, said ring having an integral inwardly projecting arm at the front of the same, an annular seat at the back of said arm and a rearwardly projecting annular flange surrounding said seat, packing material in said rearwardly facing seat, a lamp cover entered into the flange from the rear of the ring and resting against said packing material, said lamp cover having a passage therethrough, substantially at the center of the ring, a supporting hub on the arm aforesaid and projecting rearwardly through the passage in the lamp cover, said hub being exteriorly screw-threaded in rear of the cover, a lamp socket mounted in said hub, a lamp globe mounted in said socket, packing surrounding the rearwardly projecting portion of the hub, a nut engaged on the screw portion of the nut for clamping said packing against the back of the lamp cover, a reflector entered in the seat within the rearwardly projecting flange and means within the flange for securing said reflector in the seat over the edge of the lamp cover.

9. A lamp comprising a rigid ring having an integral supporting post and provided with a radial arm having a substantially centrally located hub, an illuminant carried by said hub, a reflector applied to the back of said ring over said illuminant, said reflector having a close joint with the ring and forming the external casing of the lamp structure, a cover over the front of the reflector and packing between the said cover and the rigid ring for sealing the front of the lamp.

10. A lamp comprising a rigid ring having an integral supporting post and provided with a radial arm having a substantially centrally located hub, an illuminant carried by said hub, a reflector applied to the back of said ring over said illuminant, said reflector having a close joint with the ring and forming the external casing of the lamp structure and an enclosing member applied to the front of the rigid ring and completing the casing of the lamp at the front.

In witness whereof, I have hereunto set my hand this 22nd day of December, 1926.

EDMUND B. NEIL.